Aug. 15, 1933. A. H. HENNE ET AL 1,922,850
SIX-THREAD STRIPING MACHINE
Filed March 28, 1932 7 Sheets-Sheet 1

Inventors
Adolf H. Henne
David M. Clark
By Attorneys
Southgate Fay & Hardy

Aug. 15, 1933.   A. H. HENNE ET AL   1,922,850
SIX-THREAD STRIPING MACHINE
Filed March 28, 1932   7 Sheets-Sheet 2
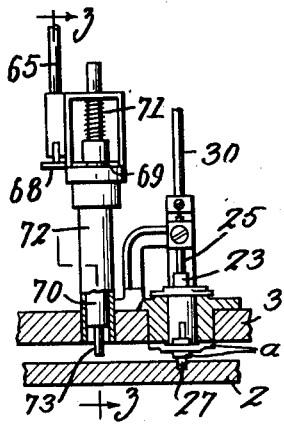
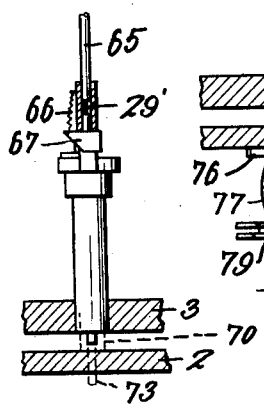
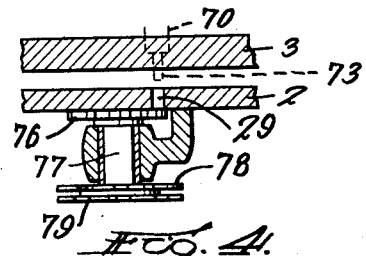
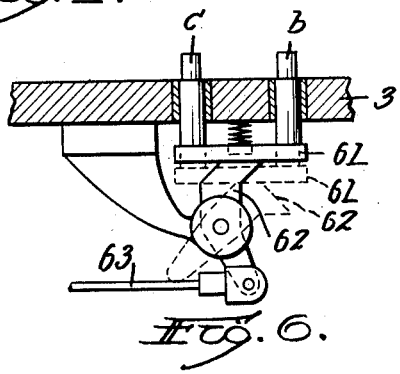
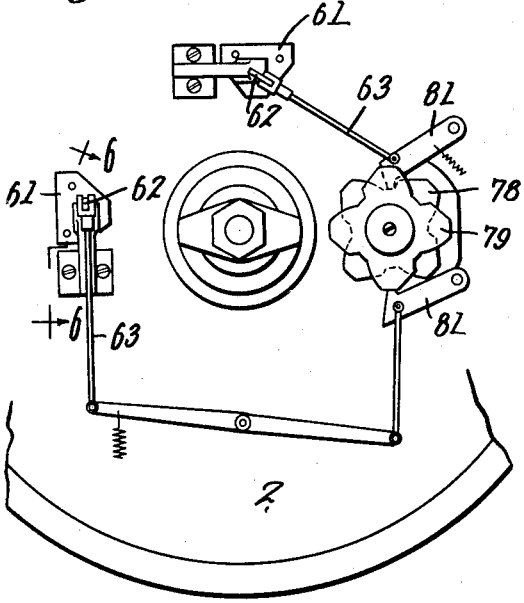
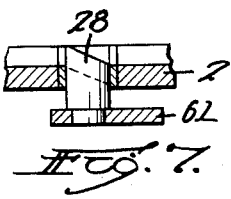
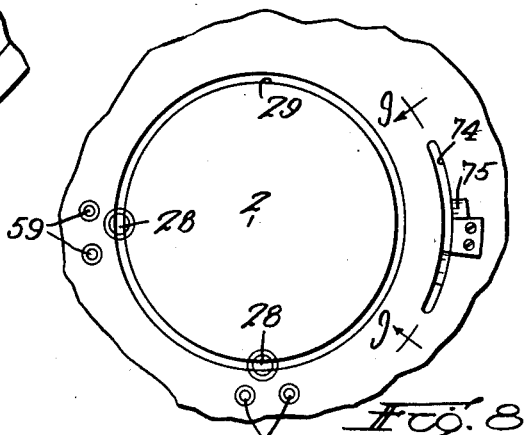
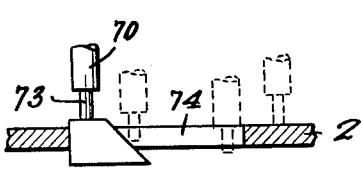
Inventors
Adolf H. Henne
David M. Clark
By Attorneys

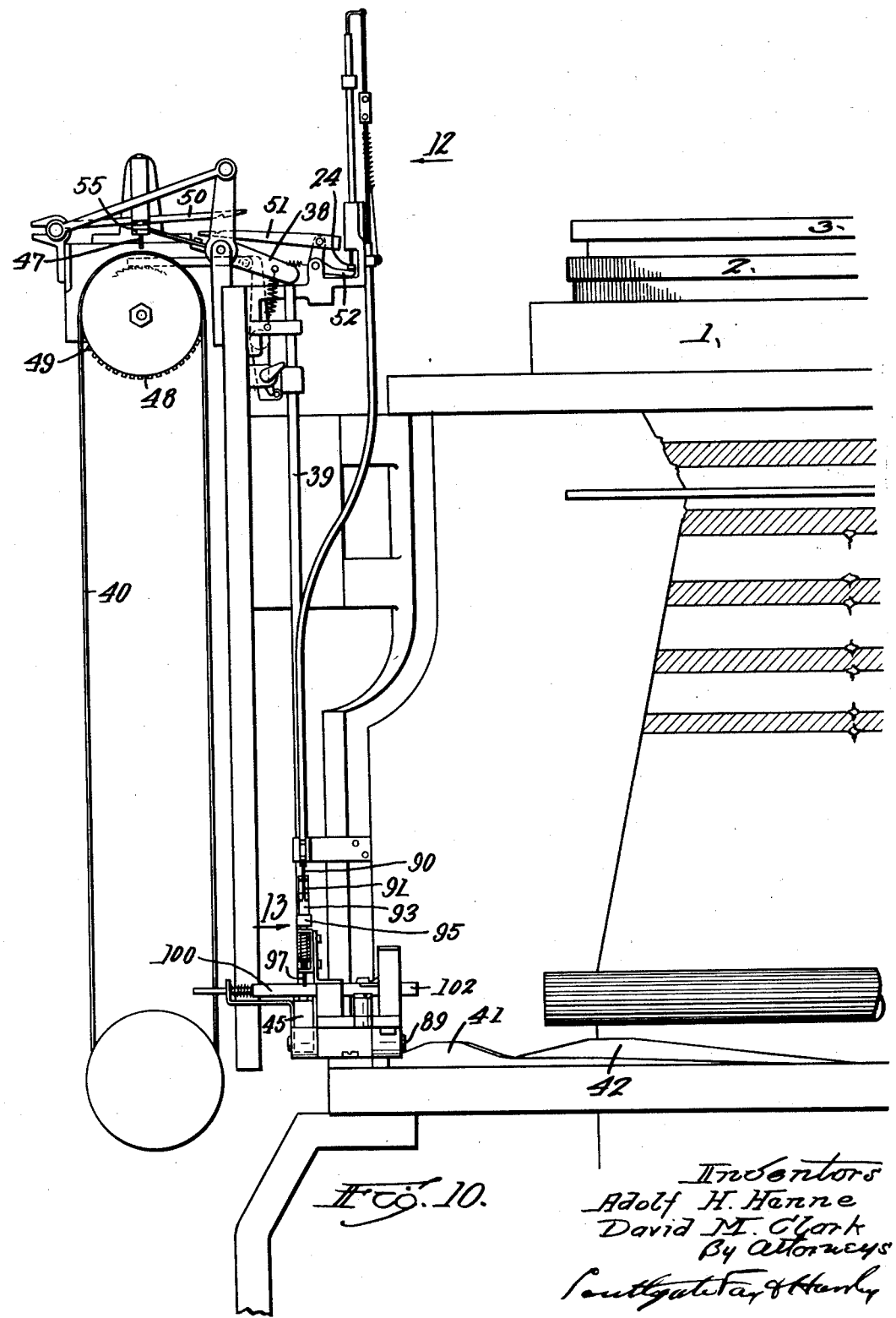

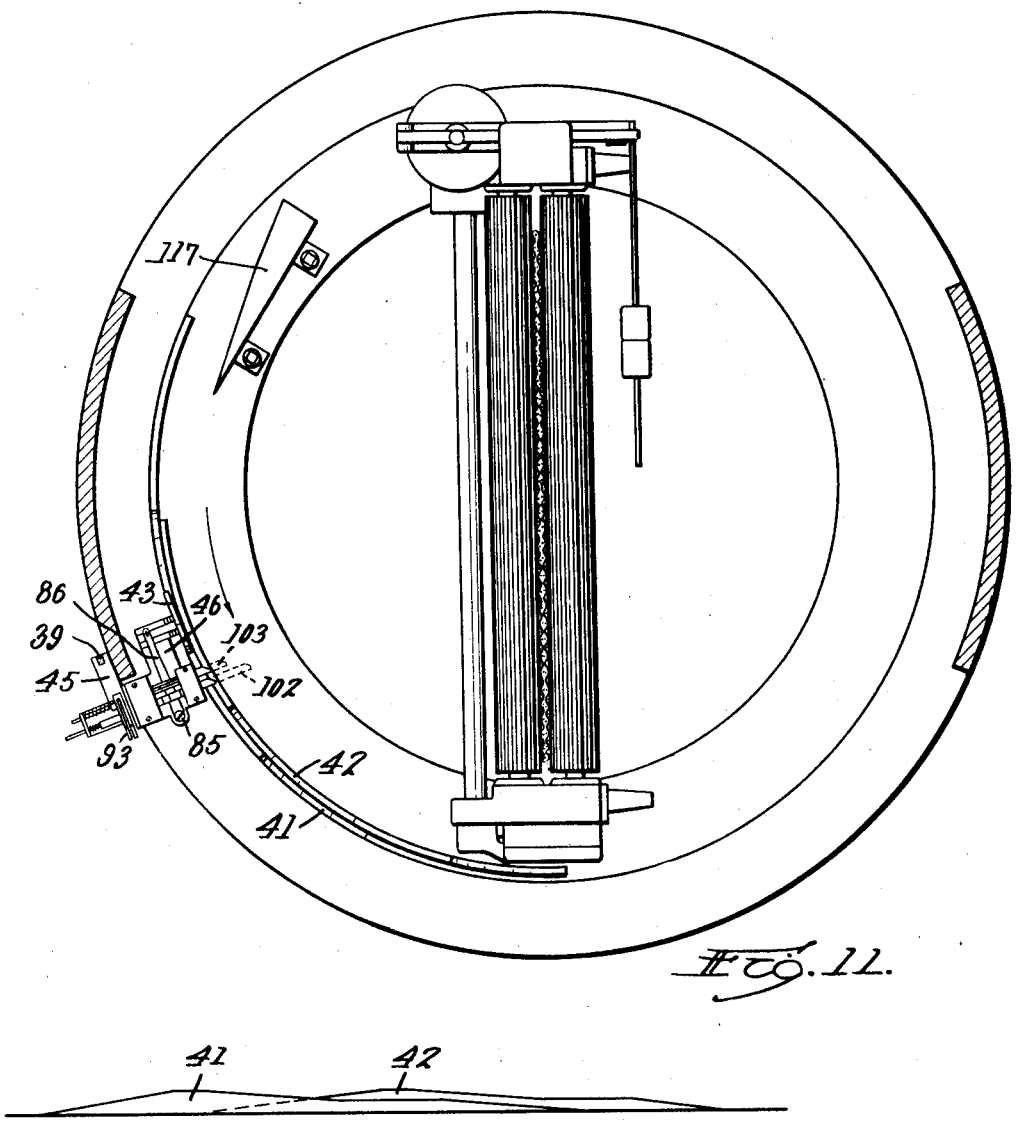

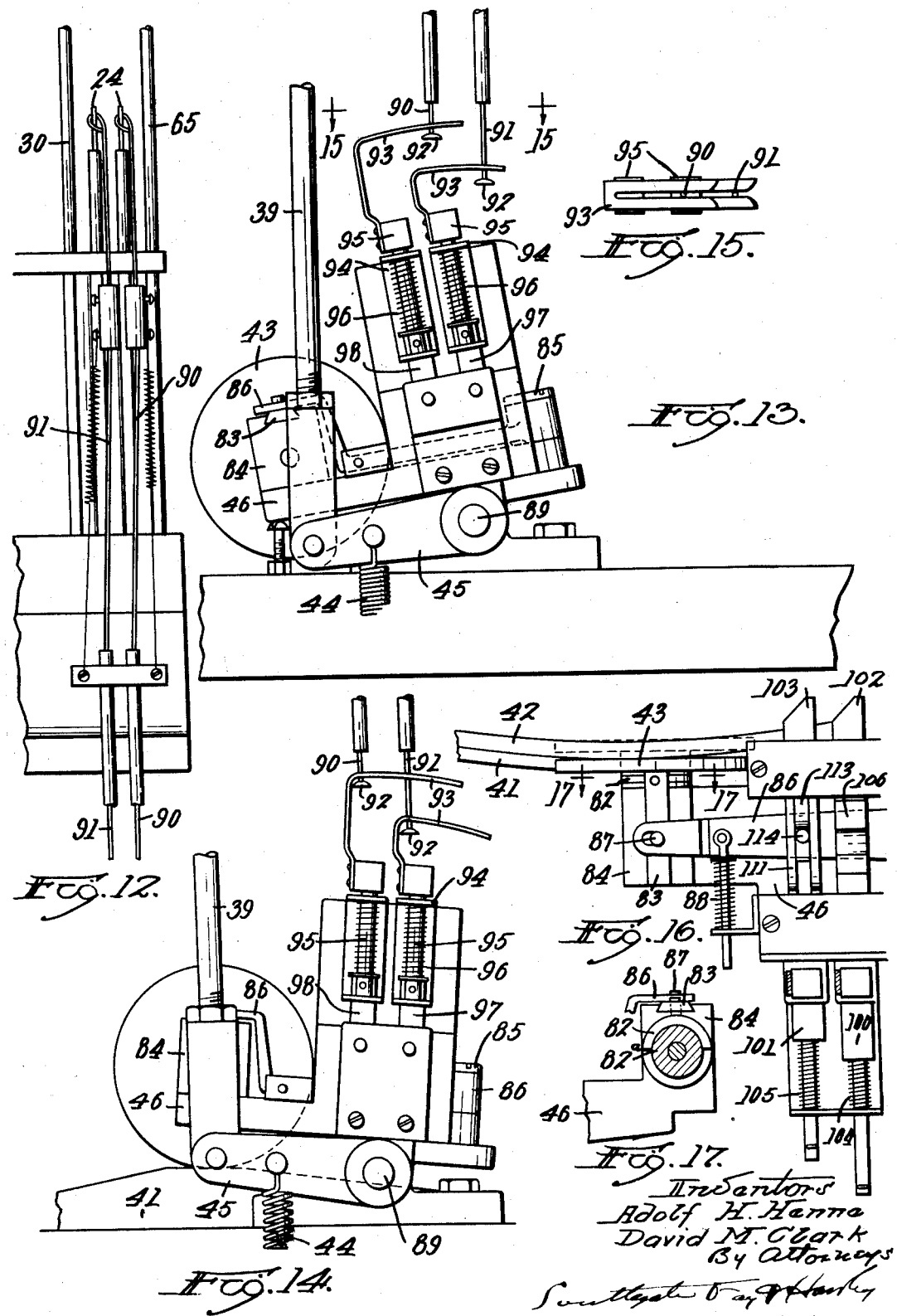

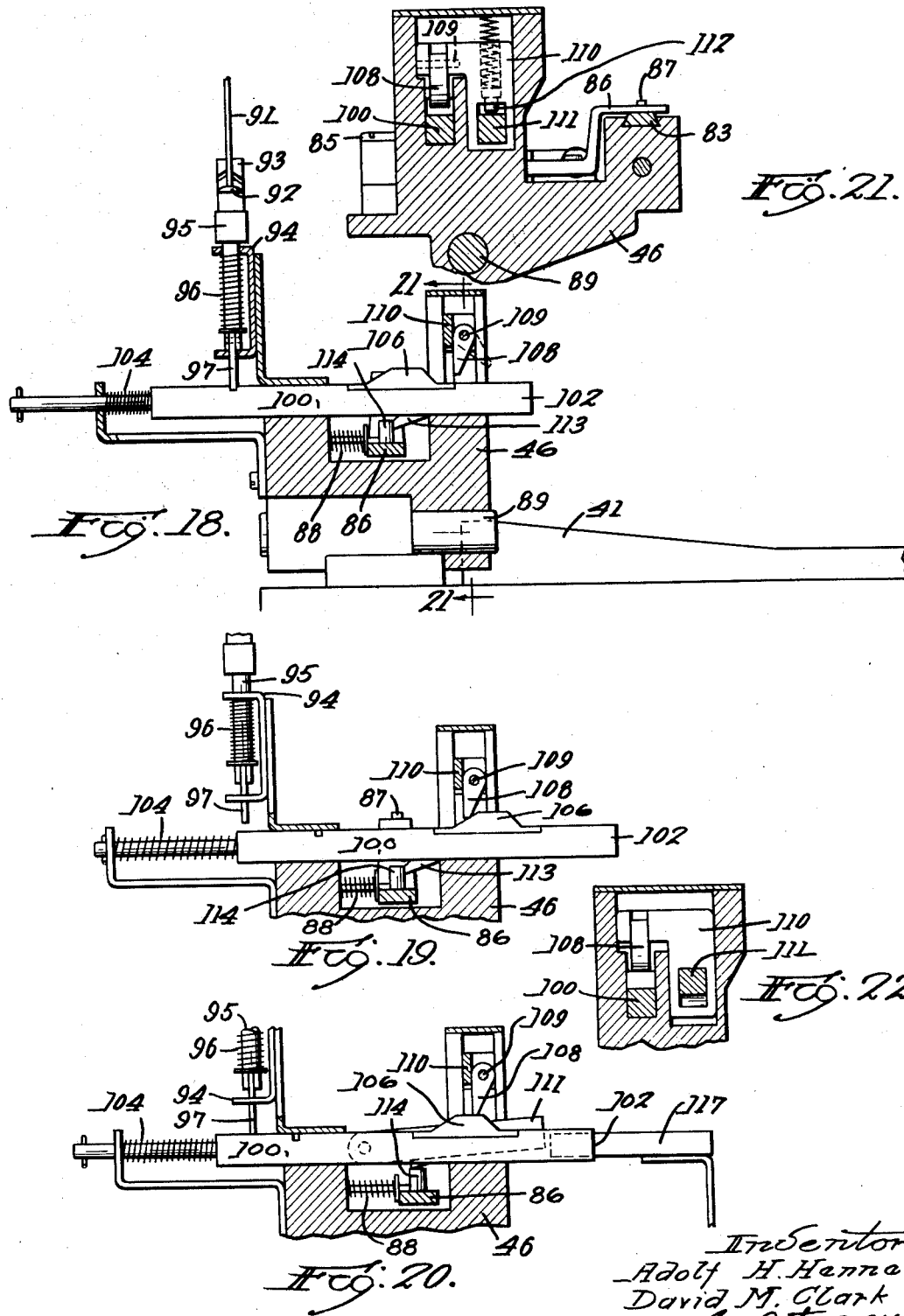

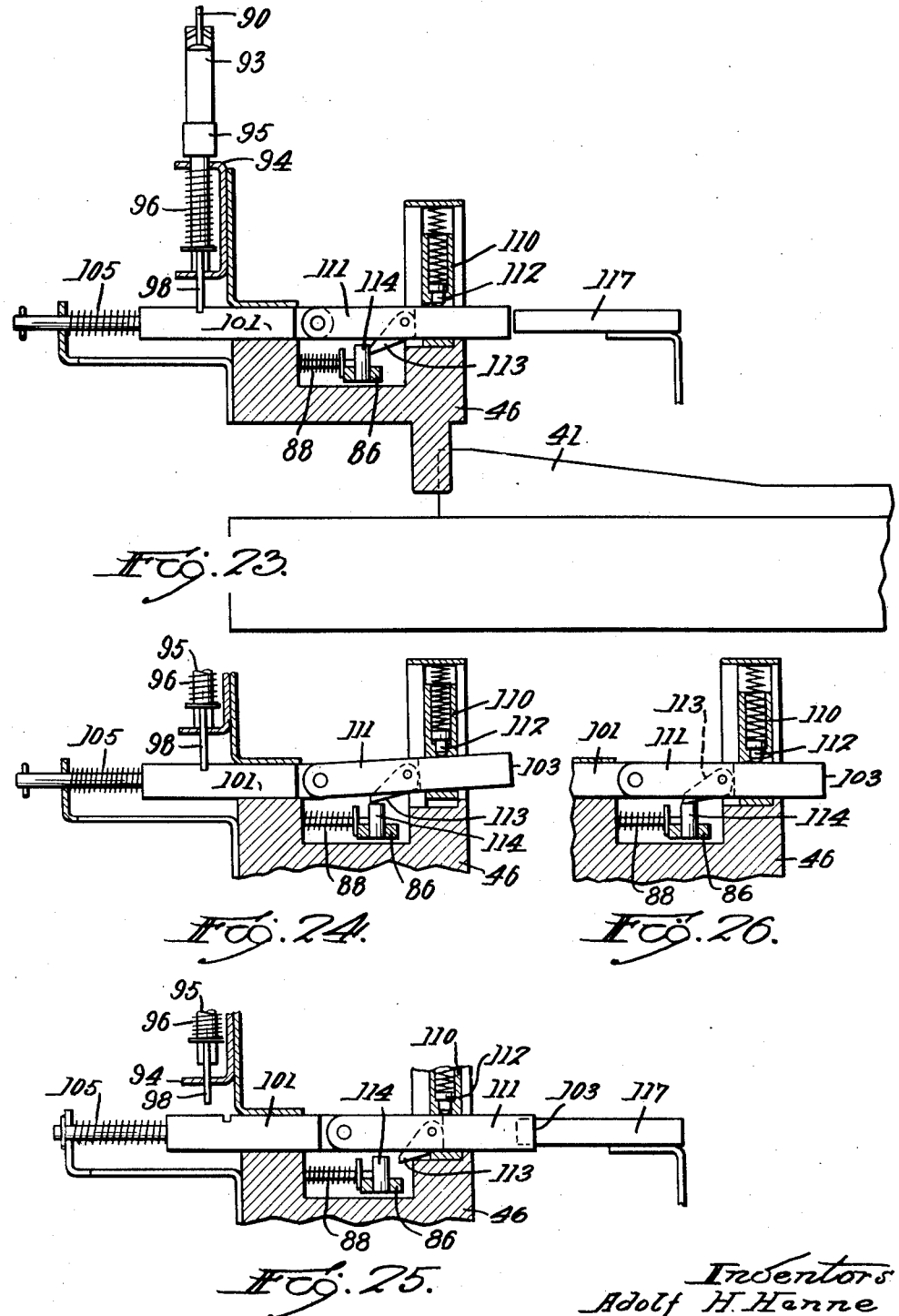

Patented Aug. 15, 1933

1,922,850

UNITED STATES PATENT OFFICE 1,922,850

SIX-THREAD STRIPING MACHINE

Adolf H. Henne and David M. Clark, Worcester, Mass., assignors to Edward T. Esty and James A. Crotty, Worcester, Mass.

Application March 28, 1932. Serial No. 601,534

13 Claims. (Cl. 66—19)

This invention relates to a ribbed knitting machine of the striping type, capable of producing a fabric such as shown in the patent to A. S. Persky, No. 1,831,192, patented November 10, 1931. This case is an improvement over our joint application Serial No. 486,567, filed October 6, 1930, patented March 22, 1932, No. 1,850,393.

The principal objects of this invention are to provide simple and practical means whereby the results secured in said joint patent can be obtained in a machine knitting only six threads or other number not divisible by four, and to provide means whereby a change in the position of the line of faulty stitches, or in other works the line of color change, can be moved abruptly a quarter of the way around a tubular fabric made from six threads.

Other objects and advantages of the invention will appear hereinafter.

Reference is to be had to the accompanying drawings, in which

Fig. 2 is a sectional view on the line 2—2 of Fig. 1;

Fig. 3 is a sectional view on the line 3—3 of Fig. 2;

Fig. 4 is a sectional view on the line 4—4 of Fig. 1;

Fig. 5 is a bottom plan of the dial of the machine shown in Fig. 1 and therefore the parts appear reversed from top to bottom;

Fig. 6 is a sectional view on the line 6—6 of Fig. 5 in full and dotted lines showing the way of changing the pins;

Fig. 7 is a sectional view of the star wheel raising cam;

Fig. 8 is a plan of the dial showing the relative positions of the two sets of pins employed in the form shown;

Fig. 9 is a sectional view on the line 9—9 of Fig. 8;

Fig. 10 is a side view;

Fig. 11 is a plan of the table taken above the fabric take-up rolls;

Fig. 12 is an elevation looking in the direction of the arrow 12 of Fig. 10;

Fig. 13 is an elevation looking in the direction of the arrow 13 of Fig. 10 and showing the parts in raised position;

Fig. 14 is a similar view showing the parts in depressed position;

Fig. 15 is a sectional view on the line 15—15 of Fig. 13;

Fig. 16 is a plan of parts shown in Fig. 1;

Fig. 17 is a section on the line 17—17 of Fig. 16;

Fig. 18 is an elevation of a part of the mechanism shown in Fig. 10 and the rest in section on a radial line;

Fig. 19 is a similar view with the parts in a different position;

Fig. 20 is a similar view with the parts in another position;

Fig. 21 is a sectional view on the line 21—21 of Fig. 18;

Fig. 22 is a similar view with the parts in different position;

Figs. 23, 24, 25 and 26 are radial sectional views showing the parts in four different positions, and Fig. 27 is a cam development.

Figure 1:
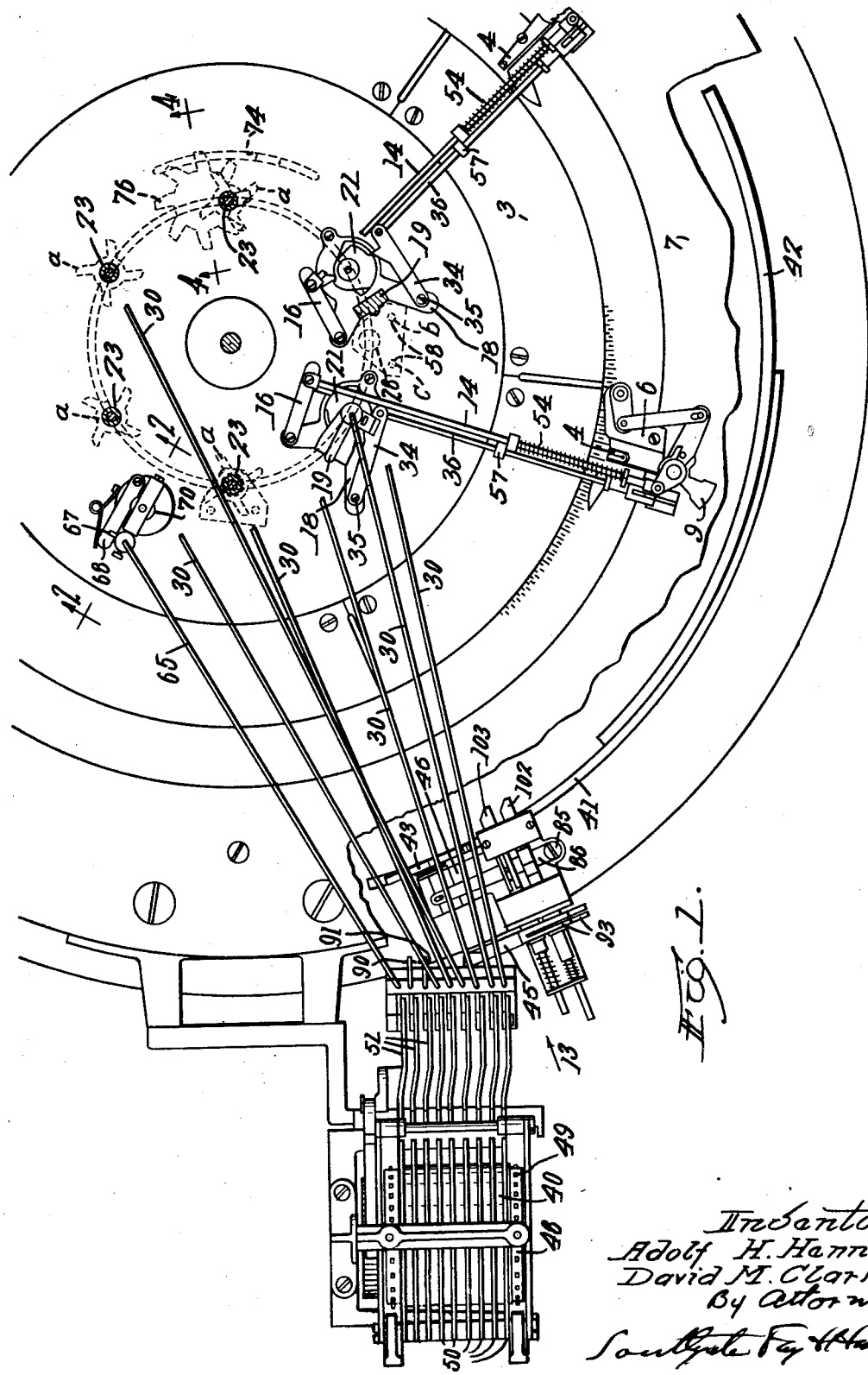
Fig. 1 is a plan of a part of a striping machine of well known type with a preferred embodiment of this invention applied thereto.

This invention is shown in this case as applied to a well known type of striping machine in which the needle carrier or carriers rotate. The needle cylinder 1, dial 2 and stationary dial cam support or cap 3 are of the usual construction. Such a machine may have any desired number of feeds, each being supplied with a different colored yarn, but this invention relates to a machine feeding six threads to produce a tubular striped fabric. The same principle would apply to a machine knitting any number of threads to which mechanism shown in our application would not apply. Our above identified joint patent shows a machine for this purpose knitting a number of threads of yarn divisible by four.

The parts of the machine shown, that are included in our above mentioned joint patent, operate as in that case. The operation can take place without trouble on an eight thread machine such as shown in said application or a larger machine in which the number of threads is a multiple of four. In a machine such as shown herein, in which six threads are used, one set of pins would come into contact with one of the star wheels and therefore modifications have to be made. This invention relates to such modifications.

We have shown part of a jacquard mechanism herein which is, in general, like that shown in the patent to Howie and Taylor, No. 1,525,608, patented Feb. 10, 1925. It operates in the same way except that, preferably at one edge, it has three extra rows of holes.

There is a yarn guide finger 4 at each feed, this being pivoted to a bracket 6 fixed to the base of the stationary cam ring 7 of the cylinder. This yarn guide finger is raised when its feed is to be thrown out of operation, by a cam member 9 having an inclined surface which, by riding over the tail end of the yarn guide finger, will elevate its inner end and raise the yarn out of work and also so that it will be cut by the shear blades (not shown) and when cut, the end of the yarn will be held by a clamp between itself and the blade, as is common practice.

A little before the yarn is lifted, cut and clamped at its loose or cut end, the raising cam of the cylinder needles and the wing cam of the dial needles are adjusted to retracted position so that the loops on the needles at this feed will not clear their latches, and hence will not knit off.

The wiper cam 9 is operated in the usual way as shown in said application. The star wheel $a$ has four arms, two of which are in a horizontal plane above the plane of the other two arms. The two high arms are diametrically opposite each other, or substantially so. The vertical shaft at its lower end projects below the star wheel, as shown at 27, into the path of a cam 28, having an inclined upper face, said cam being carried by the dial 2. The lower end of the post or shaft when in its lowermost position projects into a groove 29 in the upper face of the needle dial, and the cam 28 is located in this groove with its high point flush with the top of the groove. The needle dial also has two pins $b$ and $c$. These pins are spaced apart circumferentially of the dial and the cam 28 for raising the post or shaft 23 with its star wheel is located on a radial line passing between the two pins. The cam 28 is fixed to a plate 61 by its shank. The two pins $b$ and $c$ are in position to strike the arms of the star wheel in succession and by their combined action thereon they give the star wheel a one-half revolution, one-quarter revolution for each pin, and consequently the cam 21 also will be given a one-half revolution at each feed changing operation. These actions presuppose that the star wheel has been thrust down from its high or idle position. As long as the post or shaft 23 with its star wheel remains in its raised position there will be no further revolution of the star wheel and the yarn feed controlled by this star wheel will not be changed by the travelling pins.

When the next change is to be made, whether this be throwing the yarn finger in or out, the star wheel must be thrust downwardly so as to bring one of its high arms in line horizontally with the pin $b$. It must be noted here that in the previous movement of the star wheel it had been left in such a position that it is only necessary to lower it in order that its upper arm may be located across the path of the pin $b$ to be struck and operated thereby to give the star wheel its first quarter rotation and to swing the next following low arm across the path of the next pin $c$, whereupon the star wheel will be given its second quarter turn and lifted to idle position again by cam 28. It will therefore be seen that the normal position of the star wheel is up, and that when the pattern mechanism calls for a change at the feed controlled by said star wheel it is thrust down so that it will be given a half turn by the pins $b$ and $c$ acting successively upon its high and low arms and the star wheel will again be in its elevated position as soon as its half turn movement is completed. For lowering the star wheel shaft 23 with the star wheel we prefer to employ pattern mechanism and flexible push connections, consisting preferably of closely coiled wire members 29', guided in tubes, one of which is shown at 30. These tubes are mounted rigidly on the machine in any suitable manner and they direct the flexible push rods down on the upper ends of the shafts or posts 23 of the star wheels, so that each time the pattern mechanism pushes one of these rods through its tube it will force the shaft 23 downwardly so that the feed controlled by the star wheel of this post or shaft will be changed, whether this change be that of throwing the feed finger down or up. The tubes 30 are curved and extend to the pattern mechanism. There is one of these tubes for each feed and in the present machine they are held by set screws in the tops of the brackets 19. The shaft 23 is held in either its elevated or lowered position by a suitable detent.

The cam 21 has an upper and a lower portion or circumferential track. The upper track operates upon the arm 16 for controlling the throwing in and out of the yarn finger and shear, and the lower circumferential track of this cam operates upon an arm 34 pivoted at 35 to the base 18 of bracket 19.

The two arms 16 and 34 embrace the cam 21 and they, together with the collars and the spring 54 and rods 14 and 36 and the springs at the raising and stitch cams, cooperate to give the various parts their movements in proper time.

When the rod 36 is moved radially outward by the high part of the lower track of the cam 21, the low part of the upper track of the cam, that is, the part nearest the center, will be opposite the arm 16, and this outward movement of the rod 36 will cause its collar 57 to press upon collar on the rod 14 and this will be transmitted through the spring 54 to force the rod 14 outwardly under control of the arm 16 riding upon the upper track of the cam 21, but if arm 16 rides upon a high part of its cam track the rod 14 can still move inwardly because the spring 54 will yield. This spring incidentally will also react through its loose collar upon the collar 57 fixed to rod 36, so that when a low part of the cam 21 comes opposite the arm 34, the latter will move inwardly and thus the spring 54 will assist in operating the dial wing cam and cylinder raising cam to their retracted or tuck position.

The parts above described are practically all old. They constitute a part of a machine now on the market. They are also shown in our above mentioned joint patent. This invention constitutes an improvement over what has been described above.

In our above identified joint patent we have shown an eight thread machine involving a change of pins $c$ and $b$. We show most of those features here applied to a six thread machine. The pins are movable vertically in the dial 2 and we have provided two pairs of them. The pins 58 are intended for use all the time. The pins 59 are used alternately with them ordinarily. Ordinarily we intend to have a single longitudinal line of faults at one end of the tubular fabric long enough to provide two bathing suits or the like and another line a quarter the way around therefrom throughout the length of the alternate two suits.

The pins 58 are normally in raised position while the pins 59 are silenced. The several star wheels $a$ are raised or lowered by the pattern card 40, through the corresponding number of flexible push rods 29' in the tubes 30 at any desired time to throw one feed unit out of action or bring any other feed unit into action. This change occurs at a point on a line extending radially through the pins 58. It is found necessary at intervals to make this charge at a different point on the goods; therefore at a predetermined time the pattern card 40 will push down the star wheel *a* that governs the feed unit to be taken out and at the same time the push rod 65 will push down to release the cylinder 70 and the plunger 73. The pins 58 will thus be silenced by the action of the plunger 73 turning the toothed wheel 76 and cams 78 and 79 and the pins 59 will be raised to turn the star wheel *a* that is to take one feed unit out and also to turn the star wheel that brings a new feed unit in. This new feed unit will thus be brought in at a point radially opposite the pins 59 instead of at the normal point opposite pins 58, or at 90°.

When the thread or yarn is changed from operation by the pins 58 to the pins 59, in a six thread machine, the pins 59 would come up under one of the star wheels *a* and result in breakage if the cam 41 were used alone. For that reason I use a second cam 42 located alongside of the cam 41 but behind it. The same roller 43 operates on both cams, one at a time.

The pins *b* and *c* are mounted on a plate 61 and an oscillating cam 62 operated by a rod 63 can be turned to either of two positions. Each rod 63 is provided with a spring operated pivoted feeler 81 for operating the respective cams 78 and 79.

Normally a spring 44 pulls downwardly against a tail extension 45 of a lever 46 and keeps the carrier 55 of the feeler fingers 47 elevated through a rod 39 and lever 38. But when the cam 41 of the rotary take up plate works under the roller 43 on the lever 46, the carrier 55 with the feeler fingers 47 are lowered and some or all of them will pass through the jacquard member according to the disposition of holes therein. This jacquard member consists of a sheet of suitable material such as heavy strong paper 40 passing over the drum 48 having teeth 49 engaging marginal perforations in the endless jacquard member.

The jacquard drum 48 is turned step by step to feed the jacquard member. The jacquard member passes over a perforated segmental fixed plate and if an opening or openings in the jacquard sheet 40 registers with an opening in the segmental fixed plate the corresponding feeler pin or finger 47 when lowered by the carrier bar 55, will go down through the registered opening or openings. Consequently the corresponding pawl arm 50, which is resting on this pin, will fall into alignment with the corresponding hooked rod 51. Then as the pawl arm 50 slides back it will pull upon the hooked rod 51, rock the corresponding bell crank 52, elevate its push pin 24 and through the spring rod 29' in the tube 30 the appropriate push pin 25 will be thrust down and the corresponding part 23 will be lowered, carrying its star wheel *a* belonging thereto so that upon the movement of the pins *b* and *c* the star wheel will be operated to throw the feed in or out.

If, however, any feeler finger or pin 47 strikes an imperforate part of the jacquard member which covers a hole in the segmental plate, it will be arrested while the carrier bar 55 continues its downward stroke and this arrested feeler finger will hold up its particular pawl arm 50 which is resting thereon so that it will not engage the corresponding hooked rod 51 as it travels rearward and consequently it will perform an idle sliding movement. The actuating bell crank 52 and the train of connections individual to this pawl arm 50, feeler finger and part 23 will not be operated and that star wheel *a* will not be turned, when the movement of the pins *b* and *c* takes place.

The parts just described operated by the cam 41 are shown in said Howie and Taylor patent. For the purposes of this invention the pattern card 40 has, in addition to the six rows of perforations for the six threads or colors, three extra rows of perforations, preferably located along one edge of the paper pattern. Under certain circumstances as will be described, the roller 43 is shifted over on the cam 42.

The outside row of holes are arranged to control a single flexible push connection 65 provided with a spring 66 to hold it up when the card does not push it down and with a cam 67. This cam engages a sliding cam plate 68 and, when the connection 65 is pushed down, this plate cam is pulled out of the neck 69 in a cylinder 70 and allows a spring 71 to push this cylinder down in a tube 72 through the cap 3. A plunger 73 on the end of the cylinder 70 is thus moved down. Therefore, as the dial 2 rotates, this plunger 73 comes down into an arcuate slot 74 in the dial 2 until it is pushed up an inclined surface 75 thereon to the top of the dial.

Now with the plunger down, the rotation of the dial 2 causes the plunger 73 to rotate a toothed wheel 76 on its own axis a part of a revolution as indicated in Fig. 4. This toothed wheel 76 is mounted on a shaft 77 and on the bottom of this shaft can be arranged two cams 78 and 79 and a washer. The cams 78 and 79 are used for the purpose of bringing into operations the pins 59 or 58 as desired and as shown in our said joint patent. In other words this action draws in the pins *b* and *c* at 58 and projects them at 59.

It will be understood that the roller 43 operating on the cam 42 has the same effect in this case as in our above identified joint patent. For the reason that when the thread is changed on a six-thread machine there is normally no place for the star wheel *a* to drop down when changing from the pins 58 to the pins 59 except unto the latter, the cam section 42 is used to advance the point of action to a position between the two sets of pins 58 and 59.

The roll 43 is mounted on a stud operated by a yoke 82 running in a circumferential groove in a collar 82ᵃ for moving the stud. A projection on the yoke extends into a hole in a radially reciprocable slide 83 mounted in ways on a block 84 which is carried by the lever 46. On this lever is also a pivot stud 85 on which is pivotally mounted a lever 86. This lever has a slot into which extends a pin 87 that projects from the slide 83. The swinging of this lever 86 therefore will move the roller 43 back and forth from one cam to the other. A spring 88 normally tends to keep it on the inner cam 42 and restores it to that position whenever released.

The lever 46 is mounted to oscillate on a supporting stud 89, and the arm 45 which is part of the lever 46 is pivotally connected, as stated above, with a vertical rod 39. This rod operates the lever 38, as stated, no matter whether the roller is on the cam 42 or the cam 41, and provides therefore for the control of the several levers 52 and rods 24.

It has been stated that the outside row of holes or perforations in the pattern member 40 control the action through the connection 65 of the pin 73, and therefore the turning of the wheel 76. The turning of this wheel controls the turning of the shaft 77 in the operation of the rods 63 and cams 62. This mechanism therefore controls the bringing into position of either the pins 58 or 59.

There are two other rows of holes adjacent to the outside row, preferably in the pattern card 40, and these two rows of holes control the next two rods 24 which in turn operate two plungers 90 and 91. Each one has a button 92 on the bottom and passes through a slot in one of a pair of springs 93, each of which is connected to a plunger 95. The plungers operate in guides 94. These plungers 95 are held by springs 96 in the lowermost position. The raising of the rods 90 and 91 will raise these rods 95 against the resistance of the springs. The plungers 95 are mounted to reciprocate on the lever 46, and they are arranged parallel with each other. At the bottom each one of these plungers 95 is provided with a pin. These two pins are designated 97 and 98. The mechanism which operates them is the same, but the two pins perform different but analagous functions.

The pin 97 constitutes a holding latch or stop for a reciprocable plunger 100 located under the rod 91. The pin 98 constitutes a similar latch for a plunger 101 located under the rod 90. These two plungers are located parallel with each other and carried by the lever 46. These plungers are provided with projecting ends 102 and 103 respectively, slanting at one side, and the plungers are pushed forwardly by springs 104 and 105 respectively.

The plunger 100 carries a cam 106, and when the pin 97 is raised and the spring 104 forces the plunger 100 from the latched position shown in Fig. 18, to the unlatched or released position shown in Fig. 19, this cam passes under an arm 108 on a stud 109. This stud has bearings in a vertically slidable box 110, and obviously this arm 108 will swing to allow the cam 106 carried by the plunger 100 to move into the position shown in Fig. 19.

Mounted on the take-up ring is a cam 117. This cam 117 will strike the projecting end 102 of the plunger 100 shortly after it has been released by the pin 97. This causes the plunger 100 to move back to its former position to be latched by the pin 97. During this movement of the plunger 100, the cam 106 will raise the arm 108 and the slidably mounted box 110 as shown in Fig. 20.

The plunger 101 is provided with a hinged or pivoted section 111, and a spring-pressed stud 112 acts to hold this pivoted section down. On the pivoted section is a gravity latch 113. Carried by the lever 86 is a pin 114.

The plunger 112, together with its spring, is supported in the vertically reciprocable box 110 carried in a recess in the lever 46. When the arm 108 and the box 110 are raised, the arm 111 will also be raised, being pivotally mounted on the plunger 101. This raises the latch 113 which releases a pin 114 in the lever 86. The roll 43 is thus pushed into the path of the cam 42 by the spring 88.

It will be seen, therefore, that the marginal hole in pattern member 40 will, when it comes into operation, lower the pin 73, turn the star wheel 76 and change the operation by pushing out the pins 58 and bringing the pins 59 into operation. At the same time an opening in the second line from the same edge will actuate the pin 91 to release the plunger 100 and allow it to go through the series of operations shown in Figs. 18, 19 and 20. This action moves the roller 43 on the cam 42. The cam 42, being in advance of the cam 41 a distance equal to one-half the space between the star wheels $a$, will lift the roller 43, lever 46 and rod 39 to lower the carrier bar 55 and move the jacquard members. Thus the star wheels $a$ will be lowered into operative position between the pins 58 and 59. The cam 42 does not have to be in advance of the cam 41 just the distance stated but can be set at any desired advance.

The machine will now knit off the necessary length of goods required, with the different colors coming in and being taken out on a line lengthwise of the goods 90° from the previous line.

When the required length of goods has been knitted off, the pins 59 are lowered, the pins 58 brought into operative position and the roll 43 and lever 46 moved over onto the cam 41.

It will be seen therefore that the marginal hole in the pattern member 40 will again come into operation, to lower the pin 73, turn the star wheel 76, and change the operation by pushing out the pins 59 and bringing the pins 58 into operation. At the same time an opening in the third line from the edge will actuate the pin 90 to release the plunger 101 and arm 111. The spring 105 will push the plunger and the arm 111 into the path of the cam 117, as shown in Fig. 25. The cam 117 will thus push the arm 111 carrying the latch 113, and the plunger 102 back to its former position. During this movement the latch 113 will move the pin 114 in lever 86 to the left, thus moving the roller 43 back into former position on the cam 41. This cam 41 can be so arranged as to bring about a change in any desired position, and of course, it is brought to a position between the pins 58 and 59, so that no clash of the star wheel will take place with the latter. This action is necessitated on a six-thread knitting machine and on some machines having other numbers of threads, and the principle is applicable thereto.

Although we have illustrated and described only a single form of the invention we are aware of the fact that modifications can be made therein by any person skilled in the art without departing from the scope of the invention as expressed in the claims. Therefore we do not wish to be limited to the particular form shown, but what we claim is:—

1. In a circular knitting machine, the combination with a dial, of a plurality of sets of pins, each set being movably mounted on said dial, means controlled by the pattern card for projecting or withdrawing the pins of the different sets, and means controlled by said pins for changing the color in the knitted fabric at the point at which the active pins are operated, of means for causing the color change operating means to move into a different position between two sets of pins.

2. In a circular knitting machine, the combination with a rotary dial, a series of yarn guides, one at each feed, a set of star wheels, means operated by each star wheel for throwing a yarn guide in or out, a pair of pins mounted on the dial for operating said star wheels, a plate carrying the pins, said plate and pins being movable, and a cam for operating said plate, of a second cam offset from the first cam for changing the position at which said plate operates, and pattern controlled means actuated by said cams for controlling the time of operation of the plate.

3. In a circular six-thread knitting machine, the combination with a dial, a plurality of sets of pins, each set being movably mounted on said dial, means controlled by the pattern card for projecting or withdrawing the pins of the different sets, a plunger, a toothed wheel carried by the dial in position to be operated by the plunger, a pair of cams carried by the toothed wheel, means operated by each of said cams for moving the pins of one set either to active or inactive position for changing the location of the color change, of an operating cam, a roller adapted to be engaged by the cam as the dial rotates, means operated by the roller for controlling the operation of the pins by the pattern card, a second cam adjacent to the first cam, and means for moving the roller from one cam to the other.

4. In a circular knitting machine, the combination with a rotary dial, a series of yarn guides, one at each feed, a set of star wheels, means operated by each star wheel for throwing a yarn guide in or out, a pair of pins mounted on the dial for operating said star wheels, a plate carrying the pins, said plate and pins being movable, a cam for operating said plate, and pattern card controlled means for operating said cam, of means for altering the position of action of one of the star wheels, when it would normally engage one of said plates, so as to cause the star wheel to change position between two of said plates.

5. In a circular six-thread knitting machine, the combination with a dial, a plurality of sets of pins, each set being movably mounted on said dial, means controlled by the pattern card for projecting or withdrawing the pins of the different sets, means controlled by said pins for changing the color in the knitted fabric at the point at which the active pins are operated, a rotary cam, a roller mounted to be engaged by the cam, a pin carrier bar, and means operated by the roller for moving the pin carrier bar into operative relation to the pattern card, of a second cam, and means controlled by the pattern card for moving the roller on the second cam, said second cam being so located as to displace circumferentially the point at which the color change occurs.

6. In a knitting machine, the combination of a cam and a roller thereon with a pattern card mechanism, means operated by the roller when moved by the cam for controlling the operation of the pattern card mechanism, a second cam located out of step with the first cam which the roller is adapted to engage to delay the action of the pattern card, and means controlled by the pattern card for forcing the roller over from one cam to the other.

7. In a circular six-thread knitting machine, the combination of a pattern card controlling mechanism comprising a pin carrier bar, a rotary operating device, a roller adapted to operate on the operating device, means connected with and operated by the roller for setting the pin carrier bar into position for operation by the pattern card, a second operating device adjacent to the first one, means for automatically setting the roller over from the path of the first named operating device into the path of the second, and means controlled by the pattern card for operating the pin carrier bar.

8. In a knitting machine, the combination with a pattern card mechanism, of means for operating it comprising two cams arranged in parallel paths, a roller adapted to cooperate with either cam, a slide on which the stud of said roller is mounted, a spring for normally holding the slide in a position to keep the roller normally on one of the cams, a reciprocable plunger, means for moving the plunger back and forth, a lever having a pin projecting therefrom, a latch on the plunger adapted to engage said pin and move the lever with it in opposition to the spring when the plunger is retracted for moving the roller on the other cam.

9. In a knitting machine, the combination of two parallel cams, one in advance of the other, a roller adapted to rest on and be operated by either cam, a pivoted lever, a slide on which the roller is journalled pivotally connected with the lever, a spring connected with the lever for normally holding the lever on the inner cam, a plunger having a pivoted portion provided with a depending spring latch, a spring for moving the plunger in one direction, a rotary cam for moving it back, a latching plunger for holding the first named plunger in its retracted position, and means controlled by the pattern card for operating the latching plunger, said lever having a pin projecting therefrom which the latch is adapted to engage to draw back the lever when the plunger is retracted and move the roller from the inner cam to the outer cam.

10. In a knitting machine, the combination of a pair of parallel cams, one in advance of the other, a roller adapted to rest on either one of the cams, a pattern card mechanism, means operated by the roller when lifted by either cam for controlling the operation of the pattern card mechanism, yielding means for holding the roller on one cam, a pair of plungers arranged radially with respect to the cam, means controlled by the pattern card for holding said plungers in retracted position, springs for moving the plungers inwardly when released, a rotatable cam for pushing the plungers back after operation, means on one plunger for moving the roll against the force of the first named spring on the other cam, whereby the action of the pattern card will be prolonged, and means operated by the other plunger for raising the said means on the first named plunger and moving it into a position in which it can act to move the roll when the first plunger is retracted.

11. In a knitting machine, the combination of a cam and a roller thereon with a pattern card mechanism, means operated by the roller when moved by the cam for controlling the operation of the pattern card mechanism, a second cam located out of step with the first cam which the roller is adapted to engage to delay the action of the pattern card, a pair of plungers having means for forcing the roller over from one cam to the other, a pair of transverse plungers acting to latch the first named plungers in retracted inoperative condition, and a third pair of plungers each controlled by a separate row of holes in the pattern card for operating the second pair of plungers.

12. In a knitting machine, the combination of a pattern card mechanism comprising a pin carrier bar, a cam, a roller on the cam for raising and lowering said bar to render the pattern card mechanism operative and inoperative, the pattern card having a pair of rows of holes, a pair of plungers directly controlled by the two rows of holes, each plunger having a button on the end, a pair of springs having slots through which said plungers pass and under which the buttons are located, so that said plungers will move the springs upwardly, a second pair of plungers connected with said springs and moved therewith by the first pair of plungers independently of each other, a pair of horizontal plungers, each having a notch into which the second plungers are adapted to engage to latch the horizontal plungers in retracted position, a second cam, and means operated by the horizontal plungers for moving the roller from one cam to the other.

13. In a knitting machine, the combination of a pair of cams for controlling the thread change, a roller adapted to rest on said cams, a pattern card mechanism, means connected with the roller for controlling the pattern card mechanism, a pair of plungers, one plunger having a latch, a lever connected with said roll for operating it, said latch being adapted to move the lever over when the plunger on which the latch is mounted is retracted to move the roll from one cam to the other, said plunger having a pivoted portion on which the latch is located, the other plunger having a cam, a reciprocable box having a guide for the pivoted portion of one plunger and provided with an arm extending downwardly into the path of said cam on the plunger, whereby one motion of the plunger having the cam will operate on said arm to raise the box and the pivoted section of the other plunger so as to move the latch up out of operative position, and a lever for moving the roll having a projection which the latch will engage when moved downwardly again for moving the lever and roller.

DAVID M. CLARK.
ADOLF H. HENNE.